US008671097B2

(12) United States Patent
Wu et al.

(10) Patent No.: US 8,671,097 B2
(45) Date of Patent: Mar. 11, 2014

(54) METHOD AND SYSTEM FOR LOG FILE ANALYSIS BASED ON DISTRIBUTED COMPUTING NETWORK

(75) Inventors: Weixun Wu, Zhejiang (CN); Jianghua Li, Zhejiang (CN); Jinyin Zhang, Zhejiang (CN); Ang Li, Zhejiang (CN)

(73) Assignee: Alibaba Group Holdings Limited, Grand Cayman (KY)

( * ) Notice: Subject to any disclaimer, the term of this patent is extended or adjusted under 35 U.S.C. 154(b) by 561 days.

(21) Appl. No.: 12/516,868

(22) PCT Filed: Sep. 29, 2007

(86) PCT No.: PCT/CN2007/070840
§ 371 (c)(1),
(2), (4) Date: Dec. 17, 2009

(87) PCT Pub. No.: WO2008/064593
PCT Pub. Date: Jun. 5, 2008

(65) Prior Publication Data
US 2010/0088354 A1    Apr. 8, 2010

(30) Foreign Application Priority Data

Nov. 30, 2006 (CN) .......................... 2006 1 0160832

(51) Int. Cl.
*G06F 7/00* (2006.01)
(52) U.S. Cl.
USPC ......................................................... 707/736
(58) Field of Classification Search
USPC ................... 707/827, 672, 722, 736, 999.007
See application file for complete search history.

(56) References Cited

U.S. PATENT DOCUMENTS

| 5,537,588 | A | 7/1996 | Engelmann et al. |
| 5,819,094 | A | 10/1998 | Sato et al. |
| 6,529,952 | B1 * | 3/2003 | Blumenau ..................... 709/223 |
| 6,598,179 | B1 | 7/2003 | Chirashnya et al. |
| 6,741,990 | B2 * | 5/2004 | Nair et al. .............................. 1/1 |
| 6,944,647 | B2 | 9/2005 | Shah et al. |
| 7,085,682 | B1 * | 8/2006 | Heller et al. .................. 702/186 |
| 7,290,007 | B2 | 10/2007 | Farber et al. |
| 7,403,946 | B1 | 7/2008 | Taylor |

(Continued)

FOREIGN PATENT DOCUMENTS

| CN | 1641637 | 7/2005 |
| CN | 1642097 | 7/2005 |

(Continued)

OTHER PUBLICATIONS

Japanese Office Action mailed Mar. 6, 2012 for Japanese patent application No. 2009-538575, a counterpart foreign application of U.S. Appl. No. 12/516,868, 6 pages.

*Primary Examiner* — Mohammed R Uddin
(74) *Attorney, Agent, or Firm* — Lee & Hayes, PLLC

(57) ABSTRACT

The present invention discloses a method and a system for log file analysis based on distributed computing network. The method includes: storing user identifiers and related log information into a log file; dividing the log file into target files each including the log information having the same user identifier; separately analyzing the target files to obtain analysis results using at least two nodes; and combining the analysis results of the nodes. The method thereby establishes relationships among various log files through user identifiers, and further analyzes the relationships among the user's accesses to various contents of a website.

15 Claims, 3 Drawing Sheets

(56) References Cited

U.S. PATENT DOCUMENTS

| | | | |
|---|---|---|---|
| 7,412,442 B1* | 8/2008 | Vadon et al. | 1/1 |
| 7,886,047 B1* | 2/2011 | Potluri | 709/224 |
| 2002/0138762 A1* | 9/2002 | Horne | 713/201 |
| 2002/0178169 A1* | 11/2002 | Nair et al. | 707/100 |
| 2003/0023715 A1* | 1/2003 | Reiner et al. | 709/224 |
| 2003/0160609 A9* | 8/2003 | Snowberg et al. | 324/300 |
| 2004/0243618 A1* | 12/2004 | Malaney et al. | 707/102 |
| 2004/0250169 A1 | 12/2004 | Takemori et al. | |
| 2005/0149675 A1 | 7/2005 | Shimada et al. | |
| 2005/0177401 A1* | 8/2005 | Koeppel et al. | 705/4 |
| 2006/0101025 A1 | 5/2006 | Tichy et al. | |
| 2006/0212459 A1* | 9/2006 | Sugimura | 707/100 |
| 2007/0106707 A1 | 5/2007 | Yamato | |
| 2009/0228685 A1 | 9/2009 | Wei et al. | |
| 2010/0094868 A1* | 4/2010 | Leung et al. | 707/726 |

FOREIGN PATENT DOCUMENTS

| | | |
|---|---|---|
| CN | 1670708 | 9/2005 |
| CN | 1791022 | 6/2006 |
| JP | 05242049 | 9/1993 |
| JP | 10097544 | 4/1998 |
| JP | 2002109140 | 4/2002 |
| JP | 2002251408 | 9/2002 |

* cited by examiner

METHOD AND SYSTEM FOR LOG FILE ANALYSIS BASED ON DISTRIBUTED COMPUTING NETWORK

This application claims priority to and is a 371 of international application PCT/CN2007/070840, filed Sep. 29, 2007, and claims priority from Chinese Patent Application No. 200610160832.5, filed in Chinese Patent Office on Nov. 30, 2006, entitled "METHOD AND SYSTEM FOR LOG FILE ANALYSIS BASED ON DISTRIBUTED COMPUTING NETWORK", and incorporates the Chinese patent application in its entirety by reference.

TECHNICAL FIELD

The present invention relates to fields of data processing, and particularly methods and systems for log file analysis based on distributed computing network.

BACKGROUND ART

Along with the development of information service on the Internet, government departments, companies, academic institutions, and research institutions either have already possessed their own websites or are building one. Each website is operated by a Web server at the backend. A Web server is software used for managing Web pages, and allows the pages to be used by a client browser either through a local network or through the Internet. Today commonly used Web servers include Enterprise servers of Apache, IIS, and Iplanet. Managing a website requires not only paying attention to daily throughput of associated server, but also understanding access instances of each page of the website, improving page contents and qualities based on click frequencies of each page, improving readability of the contents, tracking data having business transaction procedures, and tracking background data for managing the website, etc.

This is particularly true for online companies with business of e-commerce or search engine. Therefore, operations and access instances of the Web server are required to undergo a detailed and thorough analysis in order to understand operation conditions of an associated website, and discover existing deficiencies to facilitate better development of the website. These requirements may be fulfilled through conducting statistics and analysis of a log file of the Web server. Commonly seen log analysis tools include WebTrends, Wusage, wwwstat, http-analyze, pwebstats, WebStat Explorer, webalizer, AWStats, etc. A process of analyzing and examining a log file is a complex process for uncovering unknown and valuable pattern(s) or rule(s) from a tremendous amount of data for the purpose of decision making.

As contents of a website are continuously updated and changed, the management team of the website needs to obtain a log file's analysis result timely, e.g., obtain such statistical data as PV (i.e., page view) of previous day on the next working day. At the same time, as the Internet becomes more popular, the number of Internet users increases continuously. Page view of a website may increase from levels of hundred thousands, and millions, to levels of tens of millions, and hundreds of millions. Log file data volume of a Web server may also increase from a few ten megabytes to a few ten gigabytes, and even up to terabytes. On the other hand, related time requirement for log file statistics and analysis has not become lower. As a result, how to timely and efficiently conduct analysis and statistics for ever-increasing log files has become an unavoidable problem encountered by the technicians in the art.

Existing commonly seen methods are log analysis methods based on distributed computing network. A distributed computing network is a computing cluster made up of multiple computers. The fundamental concept of distributed processing is to have a file divided into multiple small files, with each small file being unrelated to one another. As such, each part of the file can be processed separately on different machines, and analysis results thereof may be combined at the end.

FIG. 1 shows a diagram illustrating a topological structure of a distributed computing network. In this figure, a log analysis server 110 is responsible for obtaining a log file from a web server, and sending divided log files separately to nodes 121, 122, and 123 for analysis. After analysis is completed, the log analysis server 110 obtains and combines analysis results of the nodes to get a final log analysis result of the web server. In analyzing a log file using distributed processing, a common practice is to divide the log file according to the associated website's structure. For example, if contents of a website are composed of news, forum, and blog, the log file is divided into news log, forum log, and blog log, and processed separately by the nodes 121, 122, and 123, respectively. Naturally, a user may decide to add new nodes based on the number of divided log files. In reality, activities of a user in accessing a website are continuous. However, the above processing method will divide log information of a user who has accessed news channel, forum, and blog into three parts, causing a failure to obtain a complete access path of the user. For example, the user may have accessed eight pages, accessing news on the first two pages (ua1, ua2), forum on the third and the fourth pages (ub3, ub4), news on the fifth and the sixth pages (ua5, ua6), and blog on the last two pages (uc7, uc8). Under this circumstance, the access path of the user is divided into three parts: the first part is ua1, ua2, ua5, ua6, which is a nexus path of the user in the news channel, the second part is ub3, ub4, an access path in the forum, and the third part is uc7, uc8, an access path of the user in the blog. As a result, originally related contents are separately processed by three nodes, leading to a disconnection of the user's access history and a failure in analyzing relationship among various contents.

SUMMARY

A goal of the present invention is to provide a method and a system for log file analysis based on distributed computing network in order to solve the problems of failing to obtain a complete access history of a user, and to analyze the relationships among various contents due to log file segmentation in existing technologies.

In order to solve the above problems, the present invention discloses a method for log file analysis based on distributed computing network. The method includes the following procedures:

store user identifiers and related log information into a log file;

divide the log file into a plurality of target files, wherein each target file contains the log information having a common user identifier;

separately analyze the plurality of target files to obtain analysis results using two or more nodes; and combine the analysis results of the nodes.

The above log file may be a log file of a web server. The web server is a server cluster formed by at least one server. The log file may be a log file set, and include log files created by the servers in the server cluster.

Preferably, to divide the log file into target files includes:

download the log file into a log analysis server;

send the log file to the nodes by the log analysis server;

divide by each node the received log file into identifier files according to the user identifiers, placing the log information having the same user identifier into the same identifier file, and send the identifier files to the log analysis server; and collect by the log analysis server the identifier files sent from the nodes and combine identifier files having the same user identifier into a single file to form the corresponding target file.

Preferably, prior to dividing the log file into identifier files in each node, the method further filters out information that is unrelated to log analysis from the log file.

Preferably, prior to analyzing the target files in the nodes, the method further orders the log information in the log file according to the times of creation of the log information.

Preferably, the user identifier is created by the web server according to the associated user's IP and a random number, and is stored in the user's local machine.

Preferably, the user identifier is stored in a cookie of the user's local machine.

The present invention further discloses a system for log file analysis based on distributed computing network. The system includes a log analysis server, and multiple nodes.

The log analysis server includes:

a collection unit used for collecting a log file of a web server, the log file including user identifiers and log information related to the user identifiers;

a storage unit used for storing the log file collected by the collection unit;

a first interface unit used for receiving and sending data; and a division unit used for dividing the log file in the storage unit into multiple target files, each target file including the log information related to the same user identifier.

The nodes includes:

a second interface unit used for receiving and sending data; and a processing unit used for analyzing the target files.

The log analysis server further has a combination unit used for combining analysis results of the plurality of nodes.

Preferably, the log file is a log file of the web server. The web server is a server cluster having at least one server. The log file is a log file set, and includes log files created by each server in the server cluster.

Preferably, the node further includes:

a filtering unit used for filtering out information that is unrelated to log analysis from the log file; and a partitioning unit used for dividing the filtered log file into identifier files according to the user identifiers and placing the log information having the same user identifier into the same identifier file.

The division unit further includes a target file generation unit used for combining the identifier files sent from the nodes which have the same user identifier into a single file to form the respective target file.

Preferably, the node further includes an ordering unit used for ordering the log information in the log file according to times of creation of the log information.

Compared with the existing technologies, the disclosed method and system may have the following advantages.

By recording user identifiers in log information of a web server, the disclosed method and system are able to establish relationships among the log information located at different places through the user identifiers even if they log file has been divided, or the log file is a log file set. Furthermore, the disclosed method and system divide the log file into target files according to the user identifiers, and allow each target file to include all the log information of a user accessing a website. This solves the problem of failing to analyze the relationships among various access contents of the user. This problem is inherent in existing technologies for log analysis using a distributed computing network.

EXEMPLARY EMBODIMENTS

The disclosed method and system are used in an environment of browser/server configuration. In order to clearly understand the present invention, basic principles of accessing a web server using a browser are briefly described prior to the introduction of specific exemplary embodiments.

Figure 1:
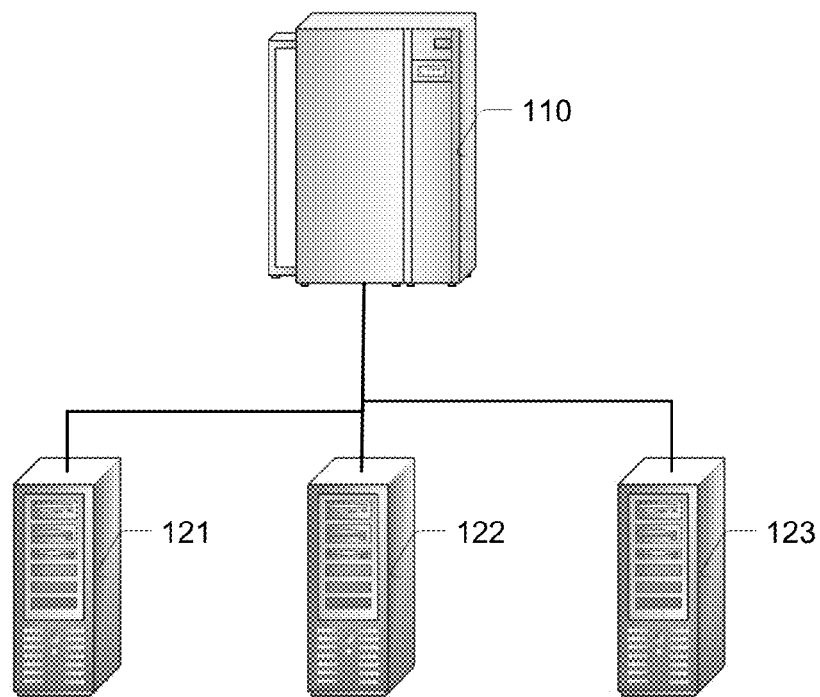
FIG. 1 shows a diagram illustrating a topological structure of a distributed computing network.
Figure 2:
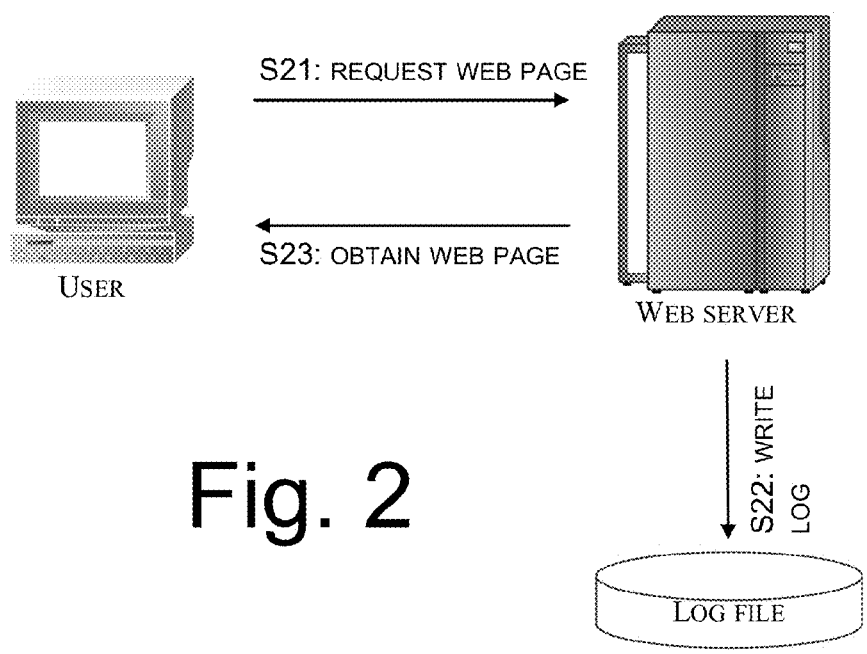
FIG. 2 shows a flow chart of accessing a web server.

FIG. 2 shows a flow chart of accessing a web server using a browser.

At S21, a user accesses a web server through a browser.

At S22, the web server writes access information of the user into a log.

At S23, the web server transmits to the user the data of a web page accessed by the user.

A log file is composed of information records of user accesses to a website, and includes IP, time of visit, and type of visiting browser of a user. Most existing log contents and formats recorded by servers satisfy the w3c standard. Below shows an example of log information in a news log file news.log:

213.42.2.21 - - [13/Oct/2006:00:14:32 +0800] "Get /china.alibaba.com/news/1.html HTTP/1.1" 200 40348 "-" "Mozilla/4.0 (compatible; MSIE 6.0; Windows NT 5.1)"

In the above, 213.42.2.21 is IP address of associated web server;

13/Oct/2006:00:14:32 +0800 is time of visit of associated user;

/china.alibaba.com/news/1.html HTTP/1.1 is web page visited by the user;

Mozilla/4.0 (compatible; MSIE 6.0; Windows NT 5.1) is environment information for the user computer, and the browser type.

In order to help clearly and easily understand the goals, the characteristics, and the advantages of the present invention, the present invention is described in further detail using accompanying figures and specific exemplary embodiments.

The method for log file analysis based on distributed computing network in accordance with the present invention includes: storing user identifiers and related log information into a log file; dividing the log file into a plurality of target files, wherein each target file contains the log information having a common user identifier; separately analyzing the plurality of target files to obtain analysis results using two or more nodes; and combining the analysis results of the nodes.

Figure 3:
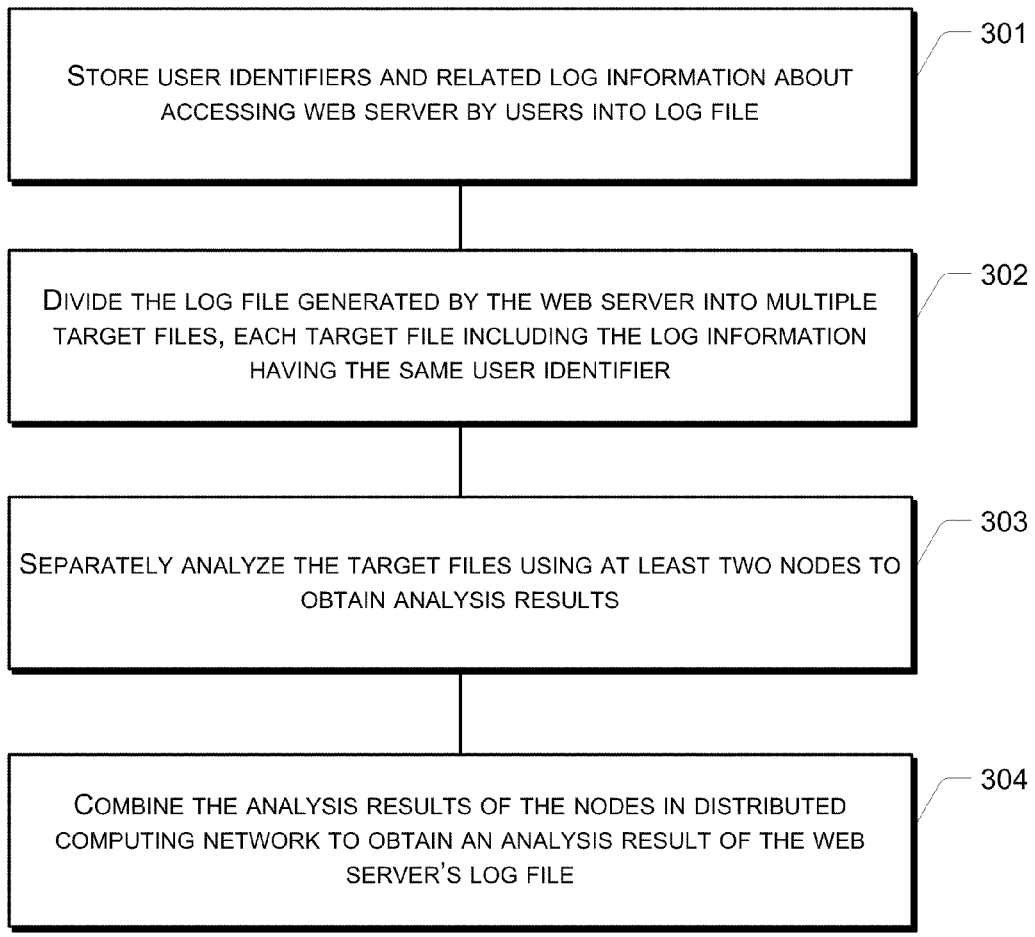
FIG. 3 shows a flow chart of a log analysis method based on distributed computing network in accordance with the present invention.

FIG. 3 shows a flow chart of a method for log file analysis in accordance with a preferred embodiment of the present invention. The preferred embodiment of the present invention is described in details below with reference to FIG. 3.

Block 301 stores user identifiers and related log information about accessing a web server by users into a log file.

Preferably, a user identifier is created by a program deployed in a web server based on the user's IP and a random number, and is sent through a network to the user to be stored in a local machine of the user. Preferably, the user identifier is stored in a cookie of the user's computer. A cookie is a piece of text information stored in a user's hard disk by a web server. The cookie allows a website to store information in a user's computer and retrieves the information at a later time. The information is stored in form of name-value pairs. When a user visits a website, the browser sends a user identifier stored in a cookie to the associated web server if the user identifier already exists in the cookie of the user's computer. If it does not exist, the web server generates a user identifier, e.g., 213.42.2.21.1160722884331.1 0, according to rules. When the web server sends a web page to the user, the web server adds the user identifier as a cookie into the HTTP header information of the web page, and sends the user identifier along with the data of the web page to the user's browser. The browser stores the cookie having the user identifier into the user's computer so that the browser may transmit the user identifier to the web server when visiting the website next time.

When the user visits the website, the web server stores the user identifier and the access information into a log file while returning the data of the web page to the browser. Below shows an example of a result of storing the user identifier 213.42.2.21.1160722884331.1 0 and the related access information in the log file: 213.42.2.21--[13/Oct/2006:00:14:32+0800]"Get/china.alibaba.com/news/1.html HTTP/1.1" 200 40348 "-" "Mozilla/4.0 (compatible; MSIE 6.0; Windows NT 5.1)" 213.42.2.21.1160722884331.1 0

It is noted that the method of creating a user identifier by a web server based on the associated user's IP and a random number and storing the user identifier in a cookie of the user's computer is only a preferred embodiment of this disclosure. The present invention does not have any limitation on what contents and what methods should be used for creating and storing a user identifier, so long as user identity can be distinguished. For example, registered name of a user in a website, or network card address of a user's computer may be used.

Block 302 divides the log file generated by the web server into multiple target files. The log information having a common user identifier is included in the same target file.

Preferably, the web server is a server cluster made up of multiple servers, with each server separately creating a log file. For example, if contents of a website are composed of three channels news, forum, and blog, each channel access can be provided by a separate server. If a user enters the news channel through the home page of the website, the associated news server will transmit to the user the data of a web page visited by the user, and display the data on the user's browser. At the same time, access information of the user is written into the news server's log file. As such, three log files are created by the three servers in the server cluster. From the server cluster's perspective, the log file of the server cluster is actually a log file set, and includes the individual log files created by each server.

Preferably, the log file is divided into multiple target files according to the following method.

If log file analysis is needed, the log files of the servers in the server cluster are collected and downloaded into a log analysis server. In case where the web server is a single server and creates a single log file, the log analysis server may need to divide this log file into multiple log files of smaller sizes according to its contents in order to satisfy distributed computing requirements.

The log analysis server sends the downloaded log files to respective nodes. Each node filters the received log file to eliminate information that is unrelated to log analysis in order to reduce the size of the log file. Each node divides the received log file into identifier files according to the user identifiers, places the records having the same user identifier into the same identifier file, and sends the identifier files to the log analysis server.

The log analysis server collects the identifier files from each node, and combines the identifier files having the same user identifier(s) into one file to form a target file.

The embodiment has the log file sent to nodes for filtering and dividing and then combined by the log analysis server into target files because log file size is generally large, and the efficiency of log analysis may be maximized in this manner. Evidently, a technician in the art may use other methods to create target files. For example, the log analysis server may complete the operations of filtering, dividing, and combining the log file and subsequently generate the target files.

Through the above operations, the log information having the same user identifier is integrated into one target file, thus establishing associated relationships among the log information that is dispersedly stored in various log files.

Block 303 separately analyzes the target files using two or more nodes to obtain an analysis result.

Log file processing using distributed computing network having two or more nodes is an efficient method for analyzing log file of large data volume. However, because distributed processing requires a log file be divided into multiple parts for separate processing, and because existing processing method divides a log file based on contents, log information of the same user may be scattered among various machines, resulting in a failure to obtain relationships between user access contents. The disclosed method, however, can handle this problem well through processing a target file that has stored all the log information about the accesses of the same user.

Preferably, prior to analyzing the target files, each node orders the log information in the respective target file according to the times of visit. As such, the target file can accurately reflect a historical sequence of accessing various contents of the website by the user, and relationships among the various contents may further be obtained therefrom. For example, a user may click on an advertisement about a certain product to enter into the home page for that product, and purchase the product at the end. Analyzing a historical sequence of the user access path in the associated log file may then help understand how many users have purchased the product through clicking on the advertisement, and thus obtain the efficiency of the advertisement.

Block 304 combines analysis results of the nodes in the distributed computing network to form an analysis result for the log file.

The following uses an example and the first exemplary embodiment to illustrate the disclosed method of this disclosure. For example, a web server of a website is a server cluster consisting of one hundred servers. Accordingly, one hundred log files are created. If each log file is 100 M in size, total log file size would be 10 G. Assuming a distributed computing network having five nodes is used for analyzing the log files. The one hundred log files are first obtained from the web server, and then filtered to eliminate contents that are irrelevant to log analysis. The one hundred log files are re-grouped into five target files based on user identifiers, with each target file having a size of 2 G. Log information having the same user identifier is all assigned to the same target file. After reordering the information records of the respective target file according to time, each node in the distributed computing network analyzes the respective target file. Finally, the analysis results of the nodes are combined to obtain an analysis result for all the log files. Using the above processing method requires only increasing the number of nodes in a distributed computing network even if the size of associated log file of a web server increases continuously.

The log file analysis method based on distributed computing network in accordance with the present invention has been described above. This disclosed method will be described in further detail below using a specific exemplary embodiment in an application environment.

In the following example, a web server cluster includes three servers which separately provide services for news, forum and blog, and create three log files news.log, club.log, and blog.log, respectively. Correspondingly, a distributed computing network is made up of a log analysis server, node 1, node 2, and node 3. Contents of each log file are shown as follows:

The log file, news.log:
213.42.2.21--[13/Oct/2006:00:14:32+0800]"Get/china.ali-baba.com/news/1.html HTTP/1.1" 200 40348 "-" "Mozilla/4.0 (compatible; MSIE 6.0; Windows NT 5.1)" 213.42.2.21.1160722884331.1 0
213.42.2.21--[13/Oct/2006:00:14:33+0800]"Get/china.ali-baba.com/news/2.html HTTP/1.1" 200 40348 "-" "Mozilla/4.0 (compatible; MSIE 6.0; Windows NT 5.1)" 213.42.2.21.1234567890123.4 0
213.42.2.21--[13/Oct/2006:00:14:34+0800]"Get/china.ali-baba.com/news/3.html HTTP/1.1" 200 40348 "-" "Mozilla/4.0 (compatible; MSIE 6.0; Windows NT 5.1)" 213.42.2.21.1234567890123.4 0
213.42.2.21--[13/Oct/2006:00:14:35+0800]"Get/china.ali-baba.com/news/4.html HTTP/1.1" 200 40348 "-" "Mozilla/4.0 (compatible; MSIE 6.0; Windows NT 5.1)" 213.42.2.21.1160722884331.1 0
213.42.2.21--[13/Oct/2006:00:14:36+0800]"Get/china.ali-baba.com/news/5.html HTTP/1.1" 200 40348 "-" "Mozilla/4.0 (compatible; MSIE 6.0; Windows NT 5.1)" 213.42.2.21.1160722884331.1 0
213.42.2.21--[13/Oct/2006:00:14:36+0800]"Get/china.ali-baba.com/news/5.jpg HTTP/1.1" 200 40348 "-" "Mozilla/4.0 (compatible; MSIE 6.0; Windows NT 5.1)" 213.42.2.21.1160722884331.1 0

The log file, club.log:
213.42.2.21--[13/Oct/2006:00:14:42+0800]"Get/china.ali-baba.com/club/1.html HTTP/1.1" 200 40348 "-" "Mozilla/4.0 (compatible; MSIE 6.0; Windows NT 5.1)" 213.42.2.21.1160722884331.1 0
213.42.2.21--[13/Oct/2006:00:14:43+0800]"Get/china.ali-baba.com/club/2.html HTTP/1.1" 200 40348 "-" "Mozilla/4.0 (compatible; MSIE 6.0; Windows NT 5.1)" 213.42.2.21.1234567890123.4 0
213.42.2.21--[13/Oct/2006:00:14:44+0800]"Get/china.ali-baba.com/club/3.html HTTP/1.1" 200 40348 "-" "Mozilla/4.0 (compatible; MSIE 6.0; Windows NT 5.1)" 213.42.2.21.1234567890123.4 0
213.42.2.21--[13/Oct/2006:00:14:45+0800]"Get/china.ali-baba.com/club/4.html HTTP/1.1" 200 40348 "-" "Mozilla/4.0 (compatible; MSIE 6.0; Windows NT 5.1)" 213.42.2.21.1160722884331.1 0
213.42.2.21--[13/Oct/2006:00:14:46+0800]"Get/china.ali-baba.com/club/5.html HTTP/1.1" 200 40348 "-" "Mozilla/4.0 (compatible; MSIE 6.0; Windows NT 5.1)" 213.42.2.21.1160722884331.1 0
60.123.45.6--[13/Oct/2006:00:14:46+0800]"Get/china.ali-baba.com/club/5.html HTTP/1.1" 200 40348 "-" "Mozilla/4.0 (compatible; MSIE 6.0; Windows NT 5.1)" 60.123.45.6.9876543210987.2 0

The log file, blog.log:
213.42.2.21--[13/Oct/2006:00:14:22+0800]"Get/china.ali-baba.com/blog/1.html HTTP/1.1" 200 40348 "-" "Mozilla/4.0 (compatible; MSIE 6.0; Windows NT 5.1)" 213.42.2.21.1160722884331.1 0
213.42.2.21--[13/Oct/2006:00:14:23+0800]"Get/china.ali-baba.com/blog/2.html HTTP/1.1" 200 40348 "-" "Mozilla/4.0 (compatible; MSIE 6.0; Windows NT 5.1)" 213.42.2.21.1234567890123.4 0
213.42.2.21--[13/Oct/2006:00:14:24+0800]"Get/china.ali-baba.com/blog/3.html HTTP/1.1" 200 40348 "-" "Mozilla/4.0 (compatible; MSIE 6.0; Windows NT 5.1)" 213.42.2.21.1234567890123.4 0
213.42.2.21--[13/Oct/2006:00:14:25+0800]"Get/china.ali-baba.com/blog/4.html HTTP/1.1" 200 40348 "-" "Mozilla/4.0 (compatible; MSIE 6.0; Windows NT 5.1)" 213.42.2.21.1160722884331.1 0
213.42.2.21--[13/Oct/2006:00:14:26+0800]"Get/china.ali-baba.com/blog/5.html HTTP/1.1" 200 40348 "-" "Mozilla/4.0 (compatible; MSIE 6.0; Windows NT 5.1)" 213.42.2.21.1160722884331.1 0

Details about the log analysis process are described as follows:

Step a: Download the above three log files are into the log analysis server of the distributed computing network.

Step b: The log analysis server transmits the log file news.log to the node 1, club.log to the node 2, and blog.log to the node 3.

Upon receiving the respective log file, each node executes the following operations:

Step c: Eliminate the log information that is not needed to be analyzed from the corresponding log file. For instance, based on IP address, or URL type, etc, the last log of news.log in the present example is about accessing a jpg file, and therefore is filtered out.

Step d: Divide the log files according to user identifiers.

The file news.log is divided into three files, news_1.log, news_2.log, and news_3.log, with the log information having the same user identifier being stored in the same file.

Contents of news_1.log include:
213.42.2.21--[13/Oct/2006:00:14:32+0800]"Get/china.ali-baba.com/news/1.html HTTP/1.1" 200 40348 "-" "Mozilla/4.0 (compatible; MSIE 6.0; Windows NT 5.1)" 213.42.2.21.1160722884331.1 0
213.42.2.21--[13/Oct/2006:00:14:35+0800]"Get/china.ali-baba.com/news/4.html HTTP/1.1" 200 40348 "-" "Mozilla/4.0 (compatible; MSIE 6.0; Windows NT 5.1)" 213.42.2.21.1160722884331.1 0
213.42.2.21--[13/Oct/2006:00:14:36+0800]"Get/china.ali-baba.com/news/5.html HTTP/1.1" 200 40348 "-" "Mozilla/4.0 (compatible; MSIE 6.0; Windows NT 5.1)" 213.42.2.21.1160722884331.1 0

Contents of news_2.log include:
213.42.2.21--[13/Oct/2006:00:14:33+0800]"Get/china.ali-baba.com/news/2.html HTTP/1.1" 200 40348 "-" "Mozilla/4.0 (compatible; MSIE 6.0; Windows NT 5.1)" 213.42.2.21.1234567890123.4 0
213.42.2.21--[13/Oct/2006:00:14:34+0800]"Get/china.ali-baba.com/news/3.html HTTP/1.1" 200 40348 "-" "Mozilla/4.0 (compatible; MSIE 6.0; Windows NT 5.1)" 213.42.2.21.1234567890123.4 0
news_3.log has no content.

Similarly, club.log is divided into three files club_1.log, club_2.log and club_3.log, with information having the same user identifier being placed in the same file.

Contents of club_1.log include:

213.42.2.21--[13/Oct/2006:00:14:42+0800]"Get/china.alibaba.com/club/1.html HTTP/1.1" 200 40348 "-" "Mozilla/4.0 (compatible; MSIE 6.0; Windows NT 5.1)" 213.42.2.21.1160722884331.1 0

213.42.2.21--[13/Oct/2006:00:14:45+0800]"Get/china.alibaba.com/club/4.html HTTP/1.1" 200 40348 "-" "Mozilla/4.0 (compatible; MSIE 6.0; Windows NT 5.1)" 213.42.2.21.1160722884331.1 0

213.42.2.21--[13/Oct/2006:00:14:46+0800]"Get/china.alibaba.com/club/5.html HTTP/1.1" 200 40348 "-" "Mozilla/4.0 (compatible; MSIE 6.0; Windows NT 5.1)" 213.42.2.21.1160722884331.1 0

Contents of club_2.log include:

213.42.2.21--[13/Oct/2006:00:14:43+0800]"Get/china.alibaba.com/club/2.html HTTP/1.1" 200 40348 "-" "Mozilla/4.0 (compatible; MSIE 6.0; Windows NT 5.1)" 213.42.2.21.1234567890123.4 0

213.42.2.21--[13/Oct/2006:00:14:44+0800]"Get/china.alibaba.com/club/3.html HTTP/1.1" 200 40348 "-" "Mozilla/4.0 (compatible; MSIE 6.0; Windows NT 5.1)" 213.42.2.21.1234567890123.4 0

Contents of club_3.log include:

60.123.45.6--[13/Oct/2006:00:14:46+0800]"Get/china.alibaba.com/club/5.html HTTP/1.1" 200 40348 "-" "Mozilla/4.0 (compatible; MSIE 6.0; Windows NT 5.1)" 60.123.45.6.9876543210987.2 0

Similarly, blog.log is divided into three files blog_1.log, blog_2.log and blog_3.log, with information having the same user identifier being placed in the same file. Content details for these files are not described repeatedly here.

Step e: Each node sends the divided files to the log analysis server.

Step f: The log analysis server combines the files having the same user identifier into one file to form a target file.

In the present example, the log analysis server receives nine files in total, of which news_1.log, club_1.log and blog_1.log are combined into filted1.log, news_2.log, club_2.log and blog_2.log are combined into filted2.log, and news_3.log, club_3.log and blog_3.log are combined into filted3.log.

Step g: The log analysis server sends the target files filted1.log, filted2.log, and filted3.log separately to the node 1, the node 2 and the node 3.

Step h: Each node reorders the information records of the respective log file according to the times of visit in the related log information.

A result after reordering the file filted1.log by the node 1 is shown as follows:

213.42.2.21--[13/Oct/2006:00:14:22+0800]"Get/china.alibaba.com/blog/1.html HTTP/1.1" 200 40348 "-" "Mozilla/4.0 (compatible; MSIE 6.0; Windows NT 5.1)" 213.42.2.21.1160722884331.1 0

213.42.2.21--[13/Oct/2006:00:14:25+0800]"Get/china.alibaba.com/blog/4.html HTTP/1.1" 200 40348 "-" "Mozilla/4.0 (compatible; MSIE 6.0; Windows NT 5.1)" 213.42.2.21.1160722884331.1 0

213.42.2.21--[13/Oct/2006:00:14:26+0800]"Get/china.alibaba.com/blog/5.html HTTP/1.1" 200 40348 "-" "Mozilla/4.0 (compatible; MSIE 6.0; Windows NT 5.1)" 213.42.2.21.1160722884331.1 0

213.42.2.21--[13/Oct/2006:00:14:32+0800]"Get/china.alibaba.com/news/1.html HTTP/1.1" 200 40348 "-" "Mozilla/4.0 (compatible; MSIE 6.0; Windows NT 5.1)" 213.42.2.21.1160722884331.1 0

213.42.2.21--[13/Oct/2006:00:14:35+0800]"Get/china.alibaba.com/news/4.html HTTP/1.1" 200 40348 "-" "Mozilla/4.0 (compatible; MSIE 6.0; Windows NT 5.1)" 213.42.2.21.1160722884331.1 0

213.42.2.21--[13/Oct/2006:00:14:36+0800]"Get/china.alibaba.com/news/5.html HTTP/1.1" 200 40348 "-" "Mozilla/4.0 (compatible; MSIE 6.0; Windows NT 5.1)" 213.42.2.21.1160722884331.1 0

213.42.2.21--[13/Oct/2006:00:14:42+0800]"Get/china.alibaba.com/club/1.html HTTP/1.1" 200 40348 "-" "Mozilla/4.0 (compatible; MSIE 6.0; Windows NT 5.1)" 213.42.2.21.1160722884331.1 0

213.42.2.21--[13/Oct/2006:00:14:45+0800]"Get/china.alibaba.com/club/4.html HTTP/1.1" 200 40348 "-" "Mozilla/4.0 (compatible; MSIE 6.0; Windows NT 5.1)" 213.42.2.21.1160722884331.1 0

213.42.2.21--[13/Oct/2006:00:14:46+0800]"Get/china.alibaba.com/club/5.html HTTP/1.1" 200 40348 "-" "Mozilla/4.0 (compatible; MSIE 6.0; Windows NT 5.1)" 213.42.2.21.1160722884331.1 0

Step i: Each node analyzes the respective reordered file to obtain an analysis result.

An analysis result for filted1.log is: nine PV, one visiting user, and one access path. An analysis result for filted2.log is: six PV, one visiting user, and one access path. An analysis result for filted3.log is: one PV, one visiting user, and one access path.

Step j: Each node sends the respective analysis result to the log analysis server which then combines all the results to obtain an analysis result for all the logs of the web server.

The analysis result for all the logs of the web server is: sixteen PV, three visiting users 213.42.2.21.1160722884331.1, 213.42.2.21.1234567890123.4, and 60.123.45.6.9876543210987.2, and three access paths. Time sequential relationships between user accesses to news and blog may be obtained at the same time.

Figure 4:
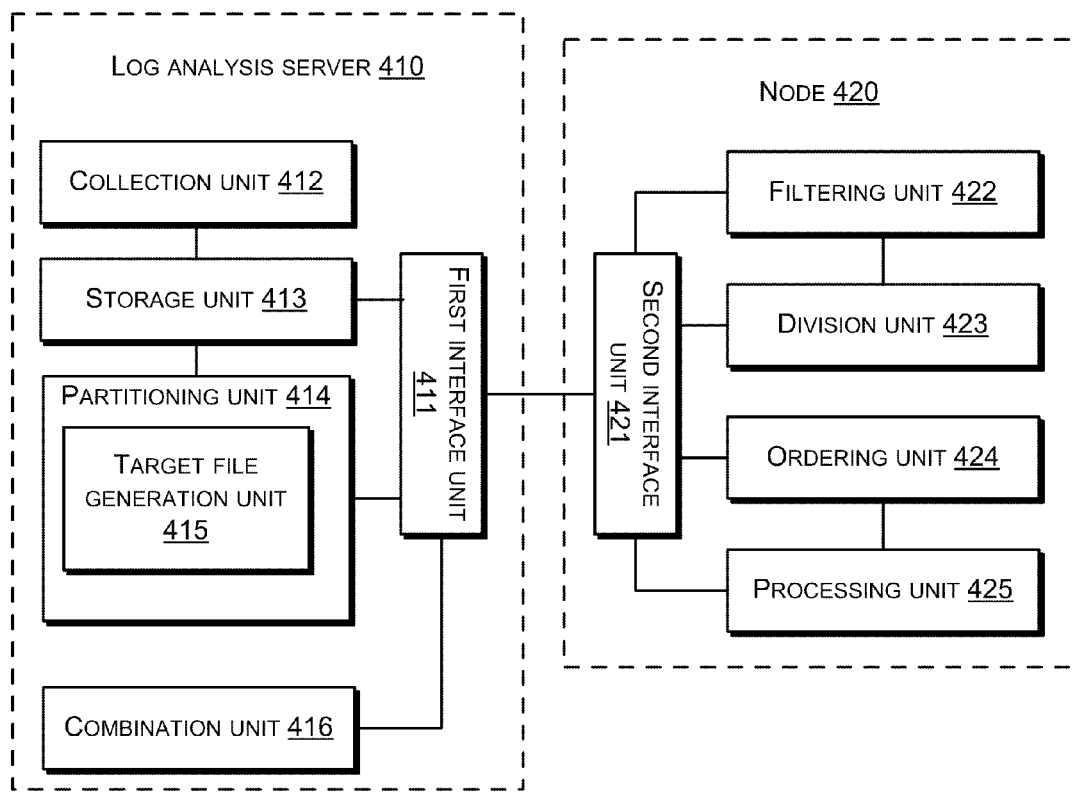
FIG. 4 shows a structural diagram of a log analysis system based on distributed computing network in accordance with the present invention.

A log analysis method based on distributed computing network in accordance with the present invention has been described above using specific exemplary embodiments. With reference to the above description, a log analysis system based on distributed computing network is shown in FIG. 4. The system includes a log analysis server 410 and related nodes 420.

The log analysis server 410 includes:
- a collection unit 412 used for collecting a log file of a web server, where the log file includes user identifiers and log information related to the user identifiers;
- a storage unit 413 used for storing the log file collected by the collection unit 412;
- a first interface unit 411 used for receiving and sending data; and
- a division unit 414 used for dividing the log file in the storage unit 413 into multiple target files, where each target file includes the log information having the same user identifier.

The node 420 includes a second interface unit 421 used for receiving and sending data and a processing unit 425 used for analyzing the target file.

The log analysis server 410 further includes a combination unit 416 used for combining analysis results of the nodes 420.

The log file is a log file of the web server. The web server is a server cluster having at least one server. The log file is a log file set, and includes log files created by the servers in the server cluster.

Preferably, the node 420 further includes:
 a filtering unit 422 used for filtering out information that is unrelated to log analysis from the log file; and
 a partitioning unit 423 used for dividing the log file filtered by the filtering unit 422 into identifier files according to the user identifiers and placing the log information having the same user identifier into the same identifier file.

The division unit 414 further includes a target file generation unit 415 used for combining the identifier files sent from the nodes which have the same user identifier into a single file to form the respective target file.

Preferably, the node further includes an ordering unit 424 used for ordering the log information in the log file according to the times of creation of the log information.

The collection unit 412 collects log files from each server of the server cluster, and stores the log files into the storage unit 413. The log files are then sent to each node through the first interface unit 411. The filtering unit 422 filters the log file received by the second interface unit 421 to eliminate information that is unrelated to log analysis. The partitioning unit 423 then divides the log file that has been filtered by the filtering unit 422 into identifier files based on user identifiers, placing the log information having the same user identifier into the same identifier file. The identifier files are subsequently sent to the log analysis server through the second interface unit 421. The target file generation unit 415 combines the identifier files which are sent from the nodes and have the same user identifier into a single target file. The first interface unit 411 sends the target files to the nodes. For each node receiving the target file, the filtering unit 424 first reorders the information records of the target file according to the times of creation of the log information in the file. The processing unit 425 then analyzes the target file to obtain an analysis result. The analysis result is returned to the log analysis server through the second interface unit 421. Finally, the combination unit 416 combines the analysis results of the nodes together to obtain an analysis result for the web server's log file.

The method and the system for log file analysis based on distributed computing network in the present invention have been described in detail above. Exemplary embodiments are used to illustrate the concept and implementation of the present invention. The exemplary embodiments are only used for the purpose of better understanding the method and the core concepts of the present invention. Based on the concepts of this invention, a person of ordinary skills in the art may make modifications to the practical implementation and application areas. In conclusion, the content of this description should not be interpreted as limitations to the present invention.

The invention claimed is:

1. A method for log file analysis based on a distributed computing network system, characterized in that the method comprises:
 storing, in a log file, a plurality of user identifiers and log information associated with the plurality of user identifiers;
 dividing the log file into a plurality of target files such that each of the plurality of target files includes log information associated with a user identifier of the plurality of user identifiers;
 prior to dividing the log file into identifier files, filtering out information that is unrelated to log analysis from the log file and ordering it according to the time of the creation of the log information;
 separately analyzing the plurality of target files to obtain analysis results using a plurality of nodes, the distributed computer network system including the plurality of nodes and a log analysis server; and
 combining analysis results of the plurality of nodes,
 wherein dividing the log file into a plurality of target files comprises:
 downloading the log file into the log analysis server of the distributed computing network;
 sending the log file to the plurality of nodes by the log analysis server;
 dividing by each node of the plurality of nodes the log file into identifier files according to the plurality of user identifiers;
 placing the log information having a same user identifier into a same identifier file;
 sending the identifier files to the log analysis server;
 collecting by the log analysis server the identifier files sent from the plurality of nodes; and
 combining identifier files having the same user identifier into a single file to form a corresponding target file.

2. The method for log file analysis as recited in claim 1, wherein the log file is a log file of a web server.

3. The method for log file analysis as recited in claim 2, wherein the web server is a server cluster formed by at least one server, and the log file is a log file set including log files created by the servers in the server cluster.

4. The method for log file analysis as recited in claim 1, further comprising:
 ordering the log information in the log file according to times of creation of the log information.

5. The method for log file analysis as recited in claim 1, wherein each user identifier is created by the web server according to the associated user's IP and a random number, and is stored in the user's local machine.

6. The method for log file analysis as recited in claim 5, wherein the user identifier is stored in a cookie of the user's local machine.

7. A system comprising:
 one or more processors;
 and memory storing a log analysis unit executable by the one or more processors to:
 dividing a log file into a plurality of target files such that each of the plurality of target files includes log information associated with a user identifier of a plurality of user identifiers;
 prior to dividing the log file into identifier files, filtering out information that is unrelated to log analysis from the log file and ordering it according to the time of the creation of the log information;
 transmit multiple log files to a plurality of nodes of a computing network based on content of each log file of the multiple log files, the multiple log files including log information associated with the plurality of user identifiers,
 combine divided log files received from the plurality of nodes to obtain multiple target files each associated with a user identifier of the plurality of user identifiers,
 send the multiple target files to the plurality of nodes, and
 combine analysis results received from the plurality of nodes to obtain an analysis result for the multiple log files; and the plurality of nodes configured to:
divide each of the multiple log files received from the log analysis unit to obtain the divided log files based on the plurality of user identifiers,
placing the log information having a same user identifier into a same identifier file;
send the divided log file to the log analysis unit,
analyze the multiple target files to obtain the analysis results, and
send the analysis results to the log analysis unit.

8. The system as recited in claim 7, wherein the transmitting of the multiple log files to the plurality of nodes of the server cluster comprises transmitting the multiple log files based on content of each of the multiple log files, the content being related to at least one of news, forums and blogs.

9. The system as recited in claim 7, wherein the sending of the multiple target files to the plurality of nodes comprises sending each of the multiple target files to a node of the plurality of nodes.

10. The system as recited in claim 7, wherein the analyzing the multiple target files to obtain the analysis results comprises analyzing, by a node of the plurality of nodes, each of the multiple log files to obtain one analysis result.

11. The system as recited in claim 7, wherein the plurality of nodes are further configured to sort the log information associated with the multiple target files based on a time that the log information associated with the multiple target files is created.

12. The system as recited in claim 7, wherein the plurality of nodes are further configured to remove, from the multiple log files, information that is not related to log analysis, the information being determined based on an Internet Protocol (IP) address associated with the information in a corresponding log file.

13. The system as recited in claim 7, wherein the plurality of nodes are further configured to sort the log information of a target file of the multiple target files based on a historical sequence of user activities of a user while the user visits a website, a user identifier of the user being associated with the target file.

14. The system as recited in claim 13, wherein the user activities include a click-through on an advertisement associated with the website or a purchase of one or more items associated with the advertisement.

15. The system as recited in claim 7, wherein the plurality of nodes are further configured to sort the log information of a target file of the multiple target files based on an analysis of an efficiency of an advertisement associated with a website that a user visits, a user identifier of the user being associated with the target file.

* * * * *